United States Patent [19]

Held

[11] Patent Number: 4,826,560
[45] Date of Patent: May 2, 1989

[54] DEVICE FOR CONTINUOUS PRODUCTION OF THERMOPLASTIC WEBS

[76] Inventor: Kurt Held, Alte Strasse 1,, D-7218 Trossingen 2, Fed. Rep. of Germany

[21] Appl. No.: 57,375

[22] Filed: Jun. 2, 1987

Related U.S. Application Data

[62] Division of Ser. No. 898,935, Aug. 21, 1986.

[30] Foreign Application Priority Data

Aug. 24, 1985 [DE] Fed. Rep. of Germany ....... 3530309

[51] Int. Cl.[4] ................................................ B30B 5/06
[52] U.S. Cl. .............................. 156/498; 156/244.27;
156/311; 156/500; 156/501; 156/583.5;
264/237; 100/93 RP; 100/153; 100/154;
425/371
[58] Field of Search ....................... 156/244.25, 244.24,
156/244.26, 244.27, 311, 322, 583.5, 500, 501;
264/40.7, 126, 171, 235, 237, 248, 257, 280, 284,
324, 346, 348, DIG. 65; 425/371; 100/93 RP,
153, 154

[56] References Cited

U.S. PATENT DOCUMENTS

| | | | |
|---|---|---|---|
| 1,952,038 | 3/1934 | Fischer | 156/244.27 |
| 2,960,727 | 11/1960 | Bradshaw et al. | 264/126 |
| 2,991,208 | 7/1961 | Stieger | 156/244.27 |
| 3,547,742 | 12/1970 | Cottrell | 156/311 |
| 3,852,387 | 12/1974 | Bortnick et al. | 264/40.7 |
| 3,876,737 | 4/1975 | Herner et al. | 264/237 |
| 4,111,744 | 9/1978 | Reinger | 264/126 |
| 4,396,566 | 8/1983 | Bronkman et al. | 264/126 |
| 4,541,889 | 9/1985 | Held | 156/583.5 |
| 4,557,778 | 12/1985 | Held | 264/284 |
| 4,599,128 | 7/1986 | Held | 156/322 |
| 4,642,153 | 2/1987 | Lohr | 156/311 |
| 4,670,080 | 6/1987 | Schwarz et al. | 156/322 |
| 4,714,015 | 12/1987 | Stabler | 156/583.5 |

FOREIGN PATENT DOCUMENTS

| | | |
|---|---|---|
| 374738 | 5/1984 | Austria . |
| 1729076 | 10/1973 | Fed. Rep. of Germany . |
| 2252219 | 2/1978 | Fed. Rep. of Germany . |
| 3343981 | 6/1985 | Fed. Rep. of Germany . |
| 0108865 | 8/1929 | Japan .................................. 264/284 |
| 556737 | 12/1974 | Switzerland . |
| 0883931 | 12/1961 | United Kingdom ........... 156/244.27 |
| 2146941 | 5/1985 | United Kingdom . |

*Primary Examiner*—Caleb Weston
*Attorney, Agent, or Firm*—Toren, McGeady & Associates

[57] ABSTRACT

A process for continuous fabrication of thermoplastic webs from at least one extruded thermoplastic web heated to processing temperature. This thermoplastic web is cooled under the application of area pressure down to a temperature at which smoothing of the surface is terminated. A calibrating and smoothing mechanism in the device for performing the process according to the invention consists of a double-band press which includes an apparatus for conducting heat away from the thermoplastic web in the reaction zone in which the area pressure is applied.

13 Claims, 7 Drawing Sheets

DEVICE FOR CONTINUOUS PRODUCTION OF THERMOPLASTIC WEBS

This is a division of pending application Ser. No. 898,935 filed Aug. 21, 1986.

The present invention is directed to a process for the continuous production of thermoplastic webs and to a device for performing this process.

Semifinished products of thermoplastic material, such as panels, sheets, bands, etc., are produced largely by extrusion. The macromolecules of the plastics melt orient themselves in the nozzle of an extruder in a preferred direction according to the direction of flow because of external forces acting thereon. This orientation freezes in the course of a rapid cooling after leaving the nozzle which results in internal stresses in the semifinished product. Furthermore, such orientations increased by vortices which are formed because of cross-sectional constrictions in the nozzle often result in breaks in the melt, wherein the plastics melt then leaves the nozzle under a stick-slip effect, which results in a rough surface of the semifinished product. A subsequent treatment of the surface of the extruded product after leaving the nozzle of the extruder is therefore required.

Known production installations for fabrication of extruded panels or sheets made from thermoplastic materials consist of an extruder with a nozzle followed by a smoothing and gauging or calibrating mechanism, means for a let-off or drawing-off of the plastics web, and devices for cutting the plastics web, stacking of panels, etc. The post-treatment required occurs here in the gauging or calibrating mechanism because of the rough surface of the extruded product. As a rule, such a gauging mechanism is a calender consisting of several rollers with surfaces polished to a high gloss. The calender effects a cooling of the extruded product with far-reaching elimination of thickness variations and a smoothing of the surface of the plastics web. The calender in this case must be adjusted in such a manner that there only occurs a smoothing of the surface without deformation of the entire web, since, otherwise, additional nonsymmetrical internal stress conditions would occur which would result in warping of the web.

A disadvantage in the utilization of the calender for smoothing and calibrating or gauging of the extruded product is, therefore, that although there does indeed result a certain smoothing of the surface, it is impossible to remove the internal stresses already existing in the web or laminate because of the extrusion process. Thus, there is the danger of working in still more additional internal stresses. In the region of the rollers of the calender, there occurs a bending of the plastics web around these rollers so that the webs must be in the thermoelastic state which, however, entails a relatively high temperature of the rollers so that only a limited cooling occurs in the region of the rollers. This cooling occurs, therefore, principally while the plastics web is wound around the cooling rollers of the calender. It is thus bent which results in a shaping defect for the flat, stress-free plastics web, which is the objective. The subsequent additional cooling in the succeeding cooling unit then occurs without pressure. But, also, while the plastics web is passing through the calender, in each case, only linear pressure acts for a short time on the web to be cooled, so that overall pressure acts only for a short time during the entire cooling phase of the plastics web, and, thus, the properties of the surface of the plastics web that have been achieved up to now are still far removed from the ideal desired state.

SUMMARY OF THE INVENTION

Proceeding from this state of the art, the present invention is directed toward providing a process and a device for the continuous production of extruded plastics webs from thermoplastic material, particularly for subsequent processing into panels or sheets, from which improved quality of the surface of the plastics webs can be achieved together with reduced internal stresses.

In accordance with the invention, thermoplastic material in the form of a molten web is extruded from extrusion means and then passed through a double-band press where the web is cooled. The cooling of the thermoplastic web from its processing temperature down to its final temperature, at which smoothing and calibration of the surface is terminated, is performed under the action of area pressure.

The advantages attainable by the present invention particularly consist in that the pressure acts upon the surface during the entire cooling period of the extruded plastics web which is in a flat position in which, also, the finished product is to be obtained. This results in an excellent surface of the plastics web of a quality not attainable heretofore. Since the web is not loaded in bending during cooling, but rather remains completely flat, no additional internal stresses can be generated in the web. Rather, it can be shown that the internal stresses unavoidably arising during the extrusion process can be largely reduced by the process according to the invention. The cooling speed of the plastics web can be advantageously adapted to the requirements of the microstructure of the respective thermoplastic material. The process according to the invention thus effects a decisive improvement in the properties of extruded plastics webs from thermoplastic material.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Figure 1:
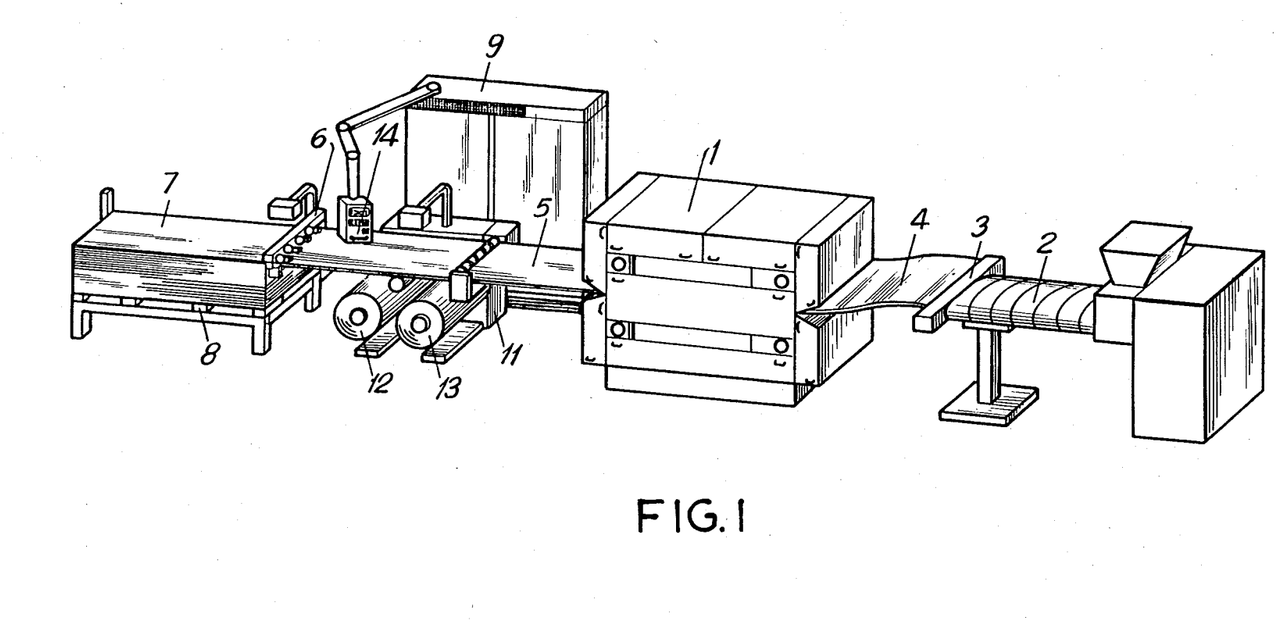
FIG. 1 is a perspective view of a production installation for continuous fabrication of a panel or sheet extruded product.

In FIG. 1, there is illustrated a production installation for the continuous fabrication of thermoplastic panels and sheets which consists of a double-band press 1 having an extruder 2 located forwardly of its feed region. A web-shaped plastics melt 4 is emitted from a nozzle 3 of the extruder 2 and is introduced in accordance with the process of the invention into the double-band press 1, wherein the web is cooled with the application of area pressure to such an extent that the plastics melt 4, after leaving the double-band press 1, is molded into a solid plastics web 5 having a smooth and polished or embossed surface. The plastics web 5 moves with constant speed towards a transverse cutting unit 6 where it is divided into panels 7 of random size which are stacked in pallets 8 for shipment. Alternatively, the plastics web 5, assuming it consists of a thin flexible web or foil, can be wound up on the roller 12 in a windup unit 11 after leaving the double-band press 1. If the roller 12 is filled, the plastic web 5 can be wound up on a substitute roller 13 without the fabrication process having to be interrupted. The entire production facility is controlled by a computer and a switching cabinet 9. Data input by the operator occurs through a terminal 14.

Figure 2:
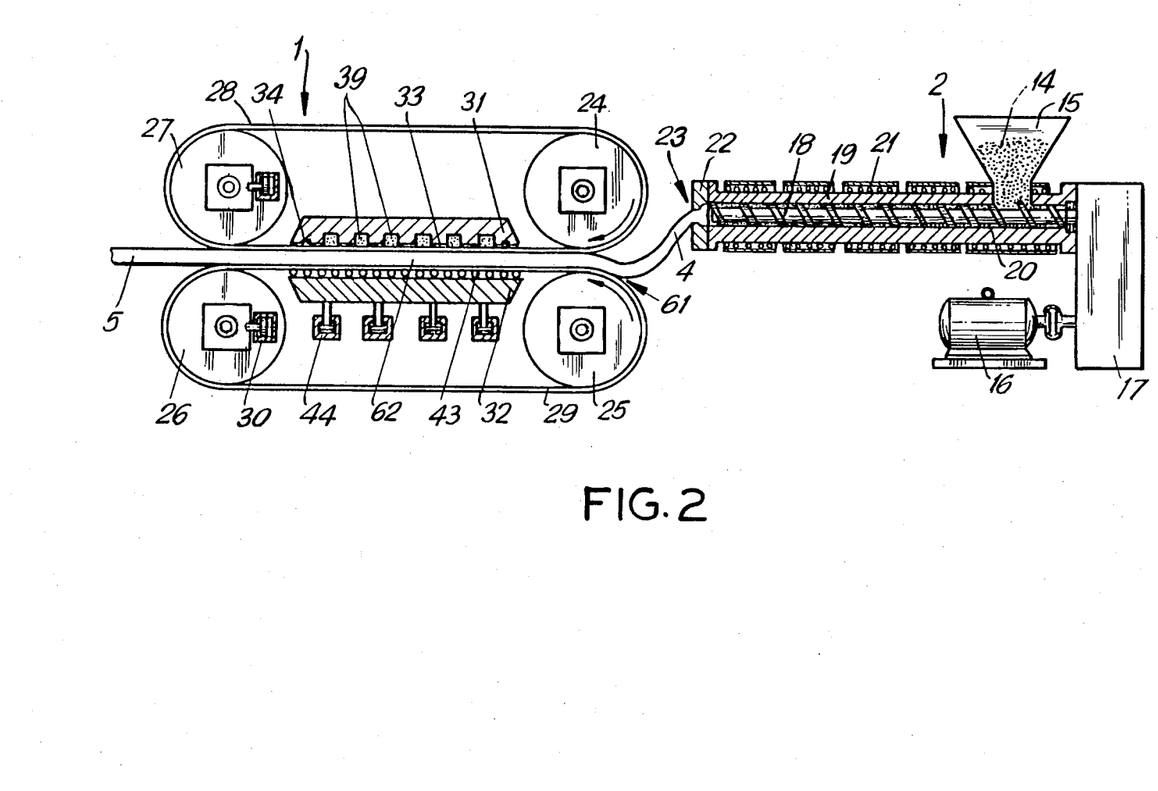
FIG. 2 is a section through a double-band press with an extruder located ahead of it.

FIG. 2 shows the extruder with the succeeding double-band press schematically in cross section. The extruder 2 comprises an elongated cylinder 19 at which an extruder screw 18 driven by a motor 16 through a reduction gear unit 17 is located. The screw 18 receives at its rear portion a granulate 14 which enters spirally shaped recesses 20 intended for the thermoplastic material to be processed. The granulate is charged into a funnel 15 of the extruder 2. This granulate is further conveyed in the screw 18 and is melted during this transportation process. For this purpose, several heating jackets 21 surround the cylinder 19. At the front end of the screw 18, the plastics material melt is homogenized and compacted and exits out of the nozzle 23 of an extruding tool 22 which is flanged at the front portion of the cylinder 19. The nozzle 23 of the extrusion tool 22 imparts a cross-sectional shape to the extruded, warm plastics material melt 4. The nozzle 23 is designed as a slot die so that there is obtained a flat web-shaped plastics material melt 4 with an essentially rectangular cross section.

The plastics material melt 4 leaves the nozzle 23 of the extruder 2 as a viscoelastic web at the processing temperature. It is taken up by the bands of the double-band press 1 and is introduced into the feed zone 61 of the double-band press 1. The continuously functioning double-band press 1 is shown in FIG. 2 also in section. It comprises four reversing drums 24, 25, 26, 27 supported in a press stand. The press stand has been omitted in the drawing for reasons of clarity. An endless press band 28, 29 consisting of metal is led around two reversing drums, respectively, located on a horizontal plane which rotate according to the arrows shown in the reversing drums 24 and 25. The press band is stretched by means of hydraulic cylinders 30. The web consisting of the plastics material melt 4 and shown in the drawing to be moving from right to left is cooled under area pressure in the reaction zone 62 between the two press bands 28, 29.

The area pressure exerted upon the plastic material melt 4 is applied by pressure plates 31 and 32 hydraulically or mechanically upon the inner sides of the press bands 28, 29, the area pressure being transferred from there onto the plastics material melt 4. A pressurizable fluid pressure medium is introduced for purposes of hydraulic pressure transmission into a space 3 which is bordered towards the top and bottom by the pressure plate 31 or the press band inner side 28 and towards the sides by a seal 34, so that the space 33 acts as a pressure cushion. Oil or air is, for instance, used by way of a fluid pressure medium. The construction of a seal 34 rectangularly closed along the edge of the pressure plate 31 can be discerned from FIG. 4. It consists of a U-shaped retaining strip 35 of metal into which an elastic sealing member 36 is squeezed. A U-shaped retaining strip 35 is located in a groove 38 along an edge of the pressure plate 31. An 0-ring 37 lies on the retaining strip 35 in the direction of the groove bottom upon which a pressure medium acts, originating from the groove bottom, so that the sealing member 36 is pressed against the inner side of the press band 28 and thus seals the space 33 towards the sides.

In order to be able to cool the plastics material melt 4 to the desired final temperature when leaving the double-band press, the pressure plates 31 and 32 are maintained at a temperature which is considerably lower than the desired end temperature of the plastics melt 4. For this purpose, channels 40 are machined in the pressure plates 31, 32, as can also be discerned from FIG. 4. A cooling fluid flows through the channels 40 which absorbs the heat and carries it away, and, thus, maintains the required temperature of the pressure plate 31 at the desired low level. Naturally, the cooling of the pressure plate can also occur electrically, for instance, by means of Peltier-cells.

Figure 3:
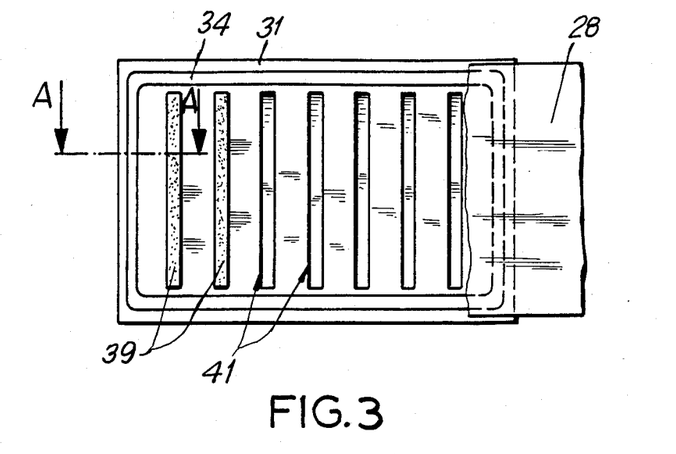
FIG. 3 is a plan view of a pressure plate.
Figure 4:
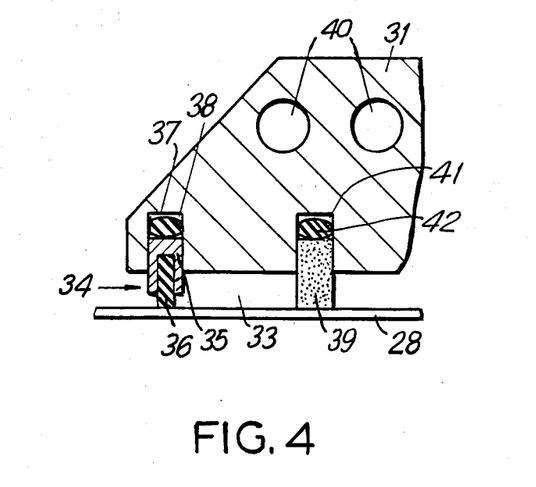
FIG. 4 is a partial section through the pressure plate along line A—A of FIG. 3.

Grooves 41 are located in the pressure plate 31 fabricated transversely to the feed direction of the press band 28 and reaches across the width of the pressure plate as can be discerned from FIGS. 3 and 4. Rod-shaped heat conducting elements 39 are inserted into these grooves 41. These heat conducting elements 39 consist of copper and are on the one hand connected with the pressure plate establishing good heat conducting contact and on the other hand touch the inner side of the press band 28 in a manner so as to drag thereon. An elastomeric seal 42 rests on the heat conducting element 39 oriented towards the groove bottom of the groove 41 upon which a pressure means is applied from the groove bottom so that the heat conducting element 39 always has contact with the press band 28.

Since a temperature gradient exists between the pressure plate 31 and the plastics melt 4, a heat flow is initiated from the plastics melt through the press band 28 and the heat conducting element 39 into the pressure plate 31 so that the plastics melt is continuously cooled while it passes through the double-band press. The speed of cooling of the plastics melt 4 in this case depends upon the temperature level of the pressure plate 31 as well as the quantity of heat conducting elements 39 and also on their heat conductivity. The achievable final temperature of the plastics melt 4 can be further regulated by the speed of the press bands 28, 29 in in the double-band press. Evidently, the pressure plate 32 can also be designed like the pressure plate 31 and contain heat conducting elements 39 wherein the cooling speed is then doubled. With regard to such heat conducting elements, reference is made herein to prior art publication DE-OS No. 33 25 578.

Mechanical pressure transmission can be provided instead of hydraulic pressure transmission in the double-band press 1 and such an embodiment will now be explained with reference to the pressure plate 32 in FIG. 2. Stationary rollers 43 consisting of metal are placed between the pressure plate 32 and the press band inner side 29. The pressure plate 32 and with it the rollers 43 are applied against the inner side of the press band 29 with the help of hydraulic cylinders 44 so that, in this way, the desired pressure is exerted upon the plastics web. The pressure plate 32 is also cooled as has already been described above. Thus, heat flow is initiated from the plastics melt 4 through the press band 29 and the rollers 43 into the pressure plate 32 and the plastics melt 4 is cooled down to the desired temperature. If the magnitude of heat flow through the rollers 43 should be insufficient, additional heat conducting elements 39 of the type previously described can be placed between the rollers. If desired, mechanical pressure transmission combined with hydraulic pressure transmission with the use of heat conducting elements can be utilized in the device according to the present invention.

After leaving the extruder 2, the plastics melt 4 is placed upon a press band 29 or 28 of the double-band press in the region of the front reversing drums 24, 25 and is conveyed by the press band into the double-band press or is extruded directly in the gap between the two reversing drums 24, 25 into the feed zone 61 so that the plastics melt 4 is taken up simultaneously by the two press bands 28, 29. While the plastics melt 4 is continuously pulled through the double-band press 1, wherein the double-band press 1 simultaneously acts as a takeoff device for the extruded product, it is also cooled with simultaneous application of area pressure. The area pressure applied acts as a calibrating or gauging device which imparts a specific thickness and a specific surface structure to the thermoplastic web. Because of the pressure being applied over an area during the cooling operation, there is advantageously obtained removal of already existing orientations of the plastics molecules and the therewith connected internal stresses originating during the extruding process so that extruded plastic panels or sheets of hitherto unobtained quality are produced with the process according to the invention.

The surface structure of the plastics web 5 leaving the double-band press 1 is to a large extent dependent upon the surfaces of the press bands 28, 29. If the press bands have a smooth surface, the surface of the plastics web is then given a smooth polished appearance since the plastics web 5 is press-finished in the double-band press 1. This effect can be additionally increased by equipping the surface of the press bands with a galvanically precipitated chrome layer having a high gloss. If the press bands have a structured surface, for instance, knobs, ornaments, corrugations or irregular structures, etc., then the plastics web 5 is imparted with an image of this pattern embossed on its surface. It is also possible to have a structured support web which, for instance, consists of a metal foil with a structured surface, circulating together with the plastics web before the double-band press in such a way that the nonstructured surface of the structured support web rests upon a press band of the double-band press and the structured surface of the structured support web rests upon the plastics melt, wherein the structuring of the structured support is then embossed onto the plastics web under the influence of the area pressure in the double-band press. When leaving the double-band press at the reversing drums 26 and 27, the structured support is then separated from the plastics web 5.

Some thermoplastic materials can require cooling in several stages. For this purpose, the pressure plates 31, 32 of the double-band press 1 are subdivided into several consecutive zones which are cooled to the differing required preset temperatures. The plastics melt 4 is then consecutively cooled to differing temperatures when it passes through the reaction zone 62 in the double-band press 1. If the plastics melt requires it, a zone without heat conducting elements can be provided respectively between two zones in the pressure plates which are equipped with heat conducting elements. In the reaction zone 62, there then follows after a cooling distance respectively one distance where the intermediate temperature is maintained so that cooling in stages of plastics melt occurs. With this embodiment, the cooling speed can also be optimally adapted to the requirements determined by the microstructure of the plastics melt. However, it should be emphasized that it is essential for the invention that cooling under area pressure down to any random end temperature occurs in the reaction zone.

It is also within the framework of the invention to heat the reversing drums 24 and 25 located at the feed end to an appropriate temperature. Such a temperature, for example, can lie between the final temperature of the plastics web 5 when it leaves the double-band press 1 and a temperature of the plastics melt 4 when it leaves the extruder 2.

Figure 9:
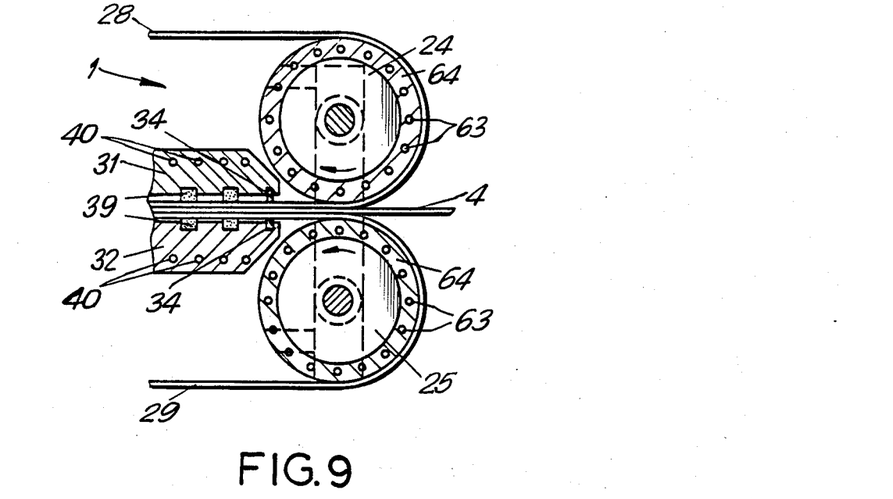
FIG. 9 is a partial sectional view of the feed zone of a double-band press with heated reversing drums.

As FIG. 9 shows, the reversing drums 24, 25 comprise channels 63 in the cylinder outer surface 64 reaching across the width of the reversing drums 24, 25. A heat carrying oil flows through the channel 63 yielding heat to the reversing drums from where the press bands 28, 29 are also heated by means of heat conduction. The press bands 24 and 25 then also have this increased temperature and the plastics melt 4 then remains in the viscoelastic state in the supply zone 61 of the double-band press 1. This advantageously allows the internal stresses of the plastics web 5 to be reduced even further and to be observe the required dimensions. The plastics web together with the pressure plates 28, 29 is then cooled in the region of the pressure plates 31, 32. It can also be appropriate to subdivide the pressure plates into a heating and cooling zone, wherein the zone facing the feed side of the reversing drums 24, 25 is heated to an appropriate temperature, and, thus, further heats the plastics melt 4 through the heat conducting elements 39. This can occur as a substitute for the heating of the reversing drums on the feed side or as a support thereof. This is important particularly in the following embodiment where several extruded thermoplastic webs are welded together. The region of the reaction zone 62 facing the reversing drums 26, 27 on the output side is again then designed as a cooling zone, as has been explained above.

Figure 7:
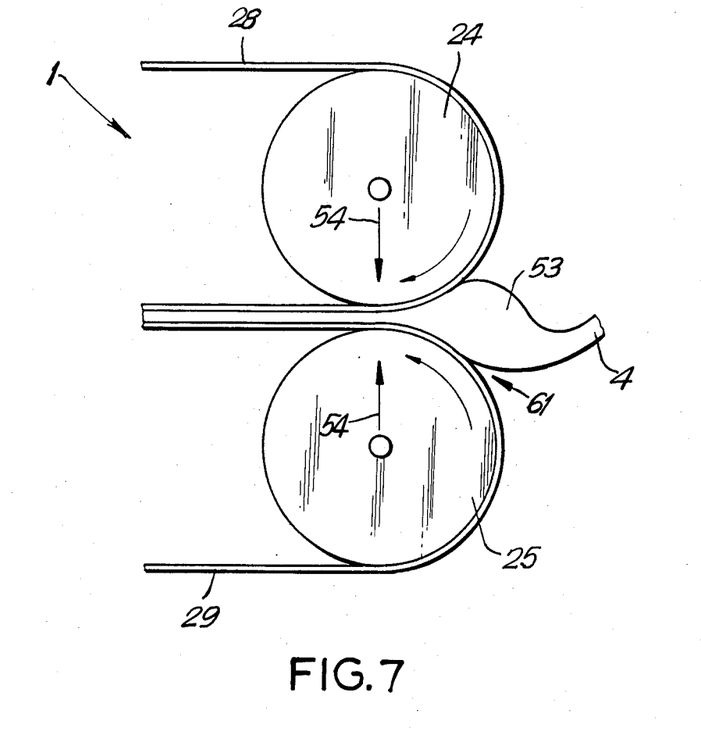
FIG. 7 is a partial side view of the feed zone of a double-band press.

As FIG. 7 shows, in extruding the plastics melt 4, there may accumulate some excess material so that a bead 53 from accumulated plastics melt forms at the feed of the double-band press in front of the reversing drums 24, 25. This may advantageously prevent air penetration together with the melt into the reaction zone 62 which could produce a defective plastics web with pores. The extrusion of the mass of the plastics melt 4 can advantageously also be regulated depending upon the size of the bead 53. Thus, uniform conditions are achieved during the entire duration of processing. In order to drive out the air already in solution in the plastics melt because of the extrusion process, the reversing drums 24, 25 located on the feed side can be adjustable toward each other in the direction of the arrow 54 which causes an additional calendering of the plastics melt 4 and a release of the air counter to the feed direction of the plastics melt. Calendering of the plastics melt 4 in the feed zone 61 by adjustment of the roller gap can also be important in order to compensate for volume contraction of the cooling melt and, in this way, to assure that the plastics web 5 is true to dimension. With respect to the design for calendering of the reversing drums on the feed side of the double-band press, reference is made to prior art publication DE-OS No. 34 02 751.

Figure 5:
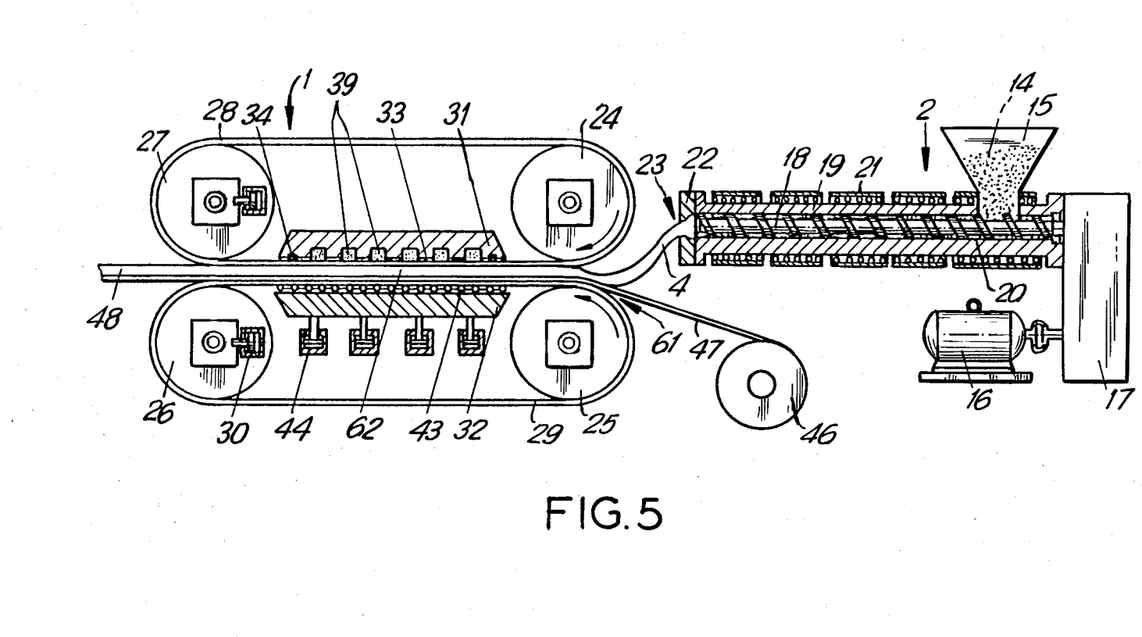
FIG. 5 is a sectional view showing a device for continuous coating of supporting webs.

FIG. 5 shows an additional device functioning in accordance with the process of the invention which serves for fabrication of support webs coated with plastics. This device comprises an extruder 2 with a slot die 23 and a double-band press 1. A roller 46 is placed in front the double-band press 1 in the vicinity of the reversing drum 25 which is located on a known windup unit not illustrated in the drawing. A support web 47 which can consist, for instance, of paper, metal or fabric is wound off the roller 46 and is fed together with the plastics melt 4 from the extruder 2 into the feed zone 61 of the double-band press 1. It is also possible that the support web 47 consist of a dispersed fiber fleece. If necessary, the support web 47 can be preheated between the roller 46 and the feed into the double-band press by means of infrared heating or hot air. When the plastics melt 4 located on the support web 47 passes through the reaction zone 62, the plastics melt 4 is cooled under area pressure and establishes a bond with the support web 47.

After leaving the double-band press 1, the coated support web 48 can be rolled up on a roller in a roller unit as shown in FIG. 1.

Figure 6:
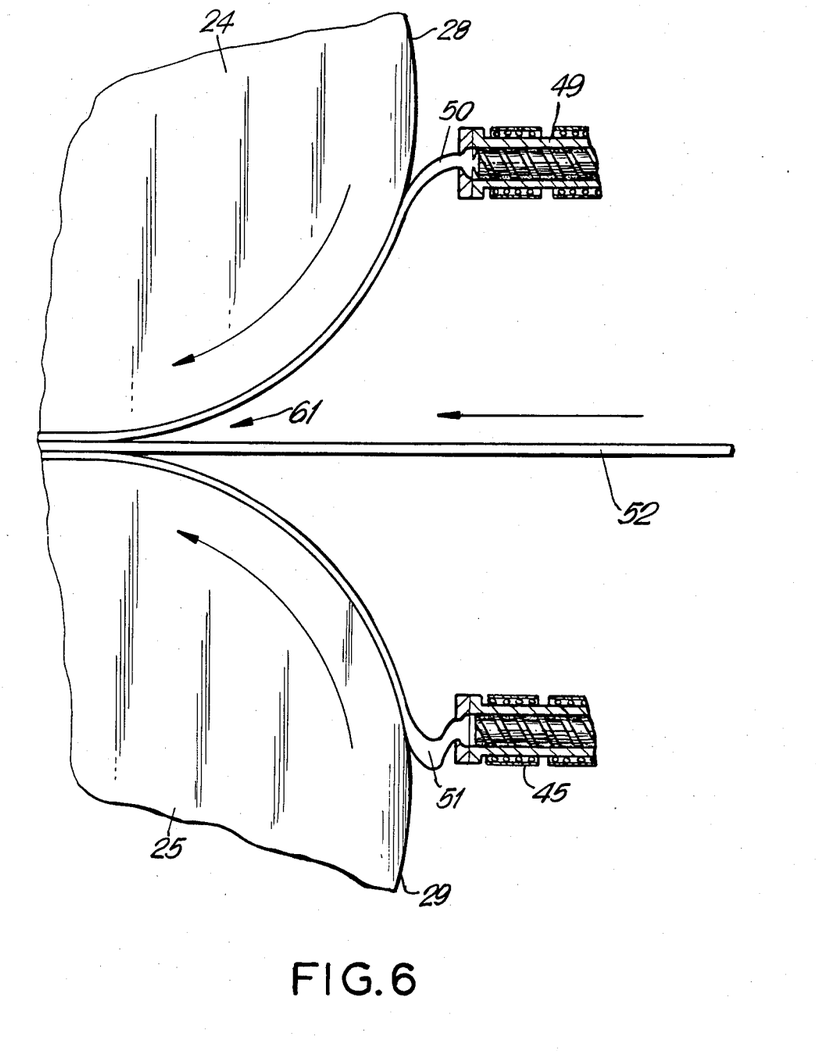
FIG. 6 is a magnified cutout of the feed zone in a device for a two-sided coating of supporting webs.

The fabrication of a support web coated on two sides with plastic is shown in FIG. 6 where the feed zone 61 of the double-band press 1 is illustrated on a magnified scale. An upper extruder 49 is placed in the vicinity of the upper feed drum 24 which extrudes a plastics melt 50 upon the press band 28. This hot plastics melt 50 adheres to the press band 28 and is conveyed by it into the double-band press 1. A lower extruder 45 is placed in the vicinity of the lower feed drum 25 and extrudes a plastics melt 51 upon the press band 29 so that this plastics melt 51 is also conveyed into the double-band press 1. Support web 52 taken off a roller moves between the plastics melt 50 and 51 toward the double-band press 1 and is led together with the plastics melt 50, 51 in the feed zone 61 in such a way that a plastics melt is located on each surface of the support web 52. The support web coated on both sides is then again cooled in the reaction zone 62 of the double-band press 1 under area pressure.

The device shown in FIG. 2 is also suited for incorporation of filler materials into the plastics web 5, such as glass or metal fibers. For this purpose, a dispersion device for fibers is placed between the extruder 22 and the reversing drum 24 on the feed side. This dispersion device disperses the corresponding fibers upon the plastics melt 4 which then sink into the melt to such an extent that they are completely covered by the thermoplastic mass. The plastics melt 4 with the embedded fibers is then cooled in the double-band press 1 to yield a plastics web reinforced with filler material.

Figure 8:
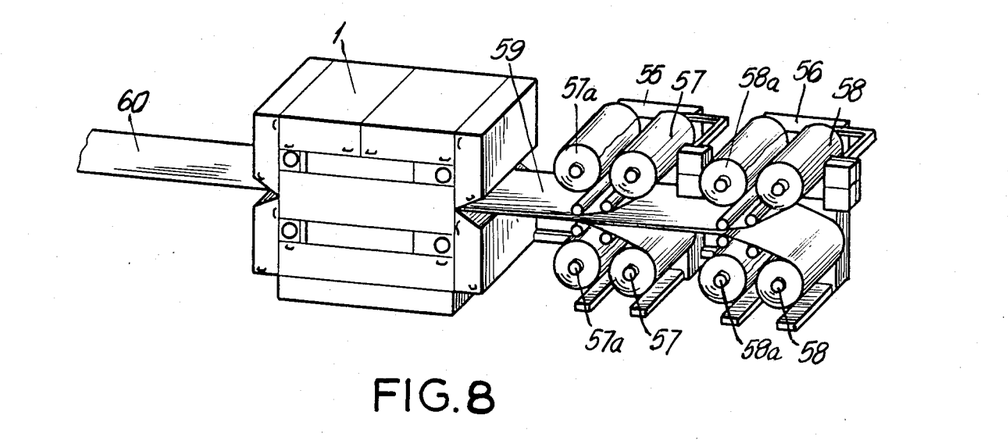
FIG. 8 is a perspective view of a device for welding of several extruded thermoplastic webs.

An additional device for performing the process according to the invention is shown in FIG. 8. This device serves for welding individual thermoplastic webs or sheets into a composite plastics web. The individual plastic sheets can consist of conventionally extruded and calendered thermoplastic foils which are stored upon rollers until they can be further processed.

Wind-off units 55, 56 are installed before the double-band press 1 in which are located rollers 57 and 58 with thermoplastic foils. These individual thermoplastic coils taken off the rollers 57, 58 are then led together before the double-band press 1 to form a layered web 59 and are introduced into the double-band press 1. A substitute roller 57a, 58a is provided for each roller 57, 58 so that, when one roller is empty, production can be maintained without interruption by threading in the appropriate substitute roller. If necessary, an infrared heating device for preheating of the layered web 59 or the individual thermoplastic foils can be placed before the double-band press 1.

In order to enable welding of individual thermoplastic foils together, the feed zone must first of all be heated to such an extent that the foils are in an elastic, molten or viscous state. For this purpose, the reversing drums of the double-band press 1 on the feed side are heated as is described above with the help of FIG. 9 so that the individual foils are heated upon contact with the press bands 28, 29. Should this be insufficient, then the region of the reaction zone of the feed side can also be heated by means of heat conductor elements from the pressure plates as has been explained in detail above. As soon as the foils have a temperature corresponding to the viscoelastic state, the individual foils are welded together under area pressure in the reaction zone to form a composite web.

During the ensuing passage through the reaction zone of the double-band press 1, this laminated, welded web is cooled in the reaction zone under area pressure in accordance with the process of the invention. For this purpose, the pressure plate in the double-band press is again equipped with heat conducting elements according to FIGS. 3 and 4, and is cooled at least in the region of the pressure plate facing the reversing drums on the output side. If necessary, the pressure plate can again be subdivided into individual zones with differing temperatures or it can enable cooling by stages. At the output side of the double-band press 1, there is obtained a cooled, compact plastics web 60 from thermoplastic material which can be wound or subdivided into individual panels as is shown in FIG. 1.

Calendering of the laminated web 59 by means of the reversing drums on the feed side is also possible in accordance with FIG. 7. If desired, a fabric web from glass fiber fabric, textile fabric, etc. can be fed together with the individual thermoplastic foils for reinforcement in order to obtain a stronger thermoplastic web 60 in this way. In spite of the fact that the individual thermoplastic foils or webs are conventionally extruded or calendered upon the rollers 57, 58, it has to be emphasized that the compact plastics web 60, where the foils are welded together, exhibits the advantages of the invention, such as reduced internal stresses, a press-finished surface, true dimensions, etc.

Figure 10:
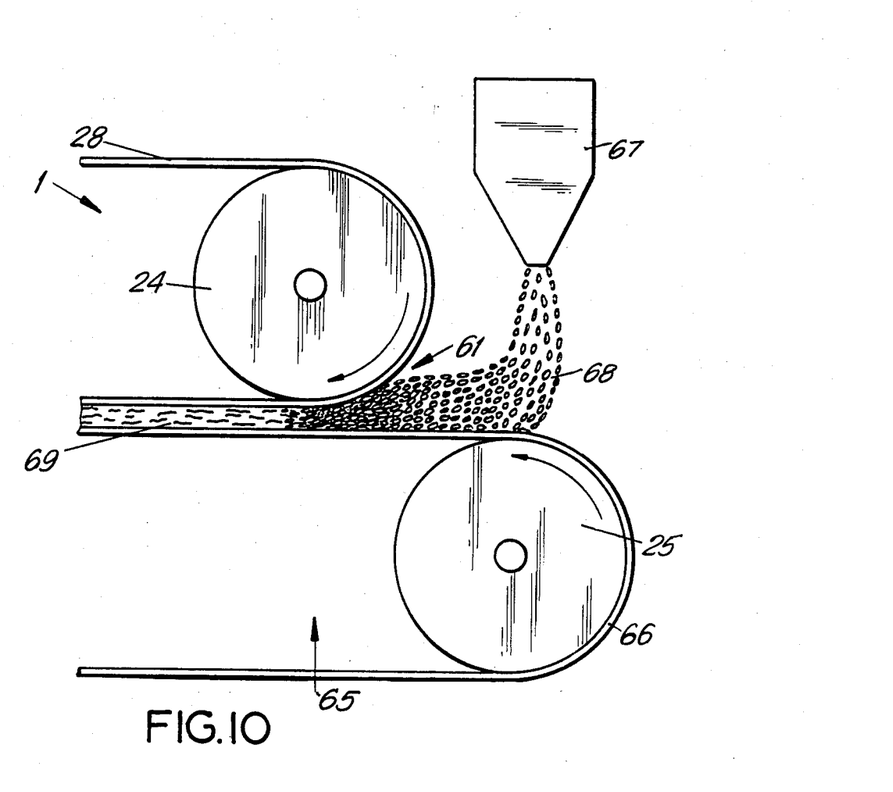
FIG. 10 is a side view of the feed zone of a double-band press with an advanced lower band unit.

A further embodiment of the process of the invention is shown in FIG. 10, in which extruded thermoplastic flakes are processed into a plastics web. The lower band unit 65 of the double-band press 1 is somewhat advanced, so that the lower press band 66 projects somewhat from the feed zone 61. A short distance before the feed zone 61, a dispersing device 67 is placed above the press band 66 which disperses extruded thermoplastic flakes 68 upon the lower press band 66 to form a fleece. This fleece is conveyed with the press band 66 into the feed zone 61, is compacted there and heated to such an extent, as has already been explained above, that it forms a continuous viscoelastic plastics web 69. Subsequently, the plastics web 69 is then again cooled under area pressure while passing through the double-band press 1. Here again, calendering of the dispersed web by means of the reversing drum on the feed side is possible. If desired, a fiber fleece can also be fed into the double-band press 1 and the extruded thermoplastic flakes or powder can as described be dispersed into this fiber fleece prior to the feed zone 61. The already described advantages according to the invention for the cooled-down plastics web also exist in this embodiment. Important in all the described embodiments is that the thermoplastic material is cooled down under area pressure for which purpose the devices in the invention are equipped with a double-band press with heat conducting elements in the pressure plate.

While specific embodiments of the invention have been shown and described in detail to illustrate the application of the inventive principles, it will be understood that the invention may be embodied otherwise without departing from such principles.

What is claimed is:

1. Apparatus for the continuous fabrication of thermoplastic webs, particularly useful for further processing into panels or sheeets, comprising: web means for producing a continuously advancing thermoplastic melt web at a processing temperature; a double-band press arranged downstream of said web means in the advancing direction of the melt web, for receiving, calibrating and smoothing the melt web, said double-band press comprising a rigid press frame, upper and lower pairs of reversing drums rotatably supported on said rigid press frame, an upper endless press belt guided over said upper pair of reversing drums and a lower endless press belt guided over said lower pair of reversing drums, said upper and lower endless press belts having outer surfaces which face each other between said upper and lower pairs of reversing drums to define a reaction zone, said reaction zone having one end between one of said upper pair of reversing drums and an adjacent one of said lower pair of reversing drums, defining a feed zone for receiving the melt web into the reaction zone; pressure means acting on at least one of said endless press belts for exerting a pressure on the melt web in said reaction zone; and cooling means for cooling the melt web in said reaction zone; said pressure means comprising a pressure plate mounted to said press frame inside at least one of said upper and lower endless press belts, said pressure plate extending over said reaction zone and being spaced from an inside surface of said one of said upper and lower endless press belts for defining a pressure space therewith, said pressure space being provided for receiving a fluid pressure medium for applying a pressure to said one of said upper and lower press belts for exerting a pressure on said reaction zone, said pressure means including an enclosing seal extending around said pressure plate and extending between said pressure plate and the inside surface of said one of said upper and lower press belts for confining a fluid pressure medium in said pressure space; said cooling means comprising said pressure plate including a plurality of cooling fluid channels for receiving a cooling fluid to cool said pressure plate to a temperature below the processing temperature for coolin the melt web to a final temperature below the processing temperature, said cooling means including a plurality of heat conducting elements in dragging contact with the inside surface of said one of said upper and lower press belts, said heat conducting elements being connected to and in heat conducting contact with said pressure plate for conducting heat from said one of said upper and lower press belts to said pressure plate and to cooling fluid flowing in said cooling fluid channels of said pressure plate, at least some of said heat conducting elements being disposed near said cooling fluid channels and said heat conducting elements being distributed along said pressure space defined by said pressure plate so that the melt web progressively cools as it moves through said reaction zone while at the same time being smoothed and calendered in said reaction zone.

2. Apparatus according to claim 1, wherein said heat conducting elements consist of copper.

3. Apparatus according to claim 1, wherein said web means comprises a takeoff arrangement with a takeoff roller for one support web arranged before said double-band press, with said support web being taken off from the roller and being brought together on at least one side with said melt web in the feed zone of the double-band press.

4. Apparatus according to claim 3, wherein an infrared radiation heating device functioning with warm air for preheating of the support web is arranged between the takeoff roller and the double-band press means.

5. Apparatus according to claim 1, wherein said web means comprises takeoff units with takeoff rollers and substitute rollers for extruded thermoplastic webs are arranged before the double-band press, these webs being taken off the rollers and being brought together to form a layered melt web and introduced directly into the double-band press.

6. Apparatus according to claim 5, wherein an infrared radiation heating device for heating the thermoplastic webs is arranged between the takeoff units and the double-band press means.

7. Apparatus according to claim 1, wherein at least one of said press belts comprises a structured press band for embossing of a structure into the surface of the melt web.

8. Apparatus according to claim 1, wherein said web means comprises extrusion means for producing an extruded, continuously advancing thermoplastic melt web, said extrusion means being arranged immediately upstream of said feed zone of said double-band press in the advancing direction of the melt web so that the double-band press receives the melt web directly from said extrusion means, said extrusion means comprising a slot die having a rectangular opening for extruding the melt web.

9. Apparatus according to claim 8, wherein a takeoff arrangement is placed before the double-band press for taking off of at least on web-shaped structured supports which together with the melt web are fed through the double-band press and rest with a structured surface on a surface of the melt web so that their structure is embossed into the surface of the thermoplastic web.

10. Apparatus according to claim 8, wherein said feed zone is defined by a gap between said adjacent reversing drums, said extrusion means being positioned so as to extrude the melt web onto the lower press belt at a location upstream of said feed zone with respect to the advancing direction of the melt web.

11. Apparatus according to claim 8, including adjustment means operatively connected to said reversing drums on opposite sides of said feed zone for moving said reversing drums on opposite sides of said feed zone toward each other to form a bead in the melt web at a location upstream of the gap forming said feed zone.

12. Apparatus according to claim 1, wherein said web means comprises a dispensing arrangement for dispensing filling material onto said lower press belt at a location upstream of said feed zone for forming the melt web in said reaction zone near the feed zone by applying pressure to the filling material.

13. Apparatus according to claim 12, wherein said dispersing arrangement dispenses extruded thermoplastic flakes and is arranged in such a way before the double-band press in the vicinity of a feed zone of said reaction zone so that the thermoplastic flakes are dispersed into a fiber fleece which is fed into the double-band press.

* * * * *